United States Patent [19]

Lederman

[11] 4,156,107
[45] May 22, 1979

[54] SPEECH SIGNAL SCRAMBLER

[75] Inventor: Salomon Lederman, Middletown, N.J.

[73] Assignee: Bell Telephone Laboratories, Incorporated, Murray Hill, N.J.

[21] Appl. No.: 874,888

[22] Filed: Feb. 3, 1978

[51] Int. Cl.² .......................................... H04K 1/00
[52] U.S. Cl. .......................... 179/1.5 R; 179/175.2 C; 179/1 SC; 328/151
[58] Field of Search ...................... 179/1.5 R, 175.2 C, 179/1 D, 1 MN, 1 SC; 328/151

[56] References Cited

U.S. PATENT DOCUMENTS

| | | | |
|---|---|---|---|
| 2,411,206 | 11/1946 | Guanella | 179/1.5 R |
| 2,510,338 | 6/1950 | Guanella | 179/1.5 R |
| 3,346,694 | 10/1967 | Brady | 179/1 SC |
| 3,504,286 | 5/1968 | Jacobacus | 179/1.5 R |
| 3,544,735 | 12/1970 | Olszewski | 179/175.2 C |
| 3,614,323 | 10/1971 | Roberts et al. | 179/1.5 R |
| 3,629,510 | 12/1971 | Anderson et al. | 179/1 SC |
| 3,647,970 | 3/1972 | Flanagan | 179/1.5 R |
| 3,909,534 | 9/1975 | Majeau et al. | 179/1.5 R |
| 3,944,752 | 3/1976 | Stearn et al. | 179/175.2 C |
| 4,022,989 | 5/1977 | Hoppough | 179/175.2 C |

Primary Examiner—Howard A. Birmiel
Attorney, Agent, or Firm—Jerry W. Herndon

[57] ABSTRACT

A method and circuitry are disclosed in a telephone system for rendering an intelligible speech signal irreversibly unintelligible but recognizable as representing speech. Samples of an electrical speech signal are repetitively generated with a sample duration and duty cycle (ratio of sample-on time to the sum of sample-off time plus sample-on time) lying within prescribed ranges. The prescribed durational range of the samples extends from about 100 milliseconds to about 1 second, which is approximately equal to the range of from 1 to 10 times the period of an average syllabic interval. The prescribed duty cycle range extends from about 20% to about 67%. This sampling technique is combined with other signal distorting techniques to render the final scrambled speech signal irreversible, unintelligible and recognizable as representing speech.

19 Claims, 1 Drawing Figure

SPEECH SIGNAL SCRAMBLER

TECHNICAL FIELD

This invention relates to telephone systems and particularly to speech scrambling circuits for use in such systems illustratively in connection with telephone line busy verification facilities.

It is common practice to provide in connection with telephone central offices and private branch exchanges (PBXs) busy verification trunk facilities by means of which an apparently busy line can be checked by an operator to determine whether the line is actually in conversational use or if the busy indication is caused by some other condition such as an accidental "off-hook" at the station. Such a check is often requested by a subscriber who has received persistent busy signals over an extended period of time while attempting to call a particular station. Through use of the busy verification facilities the operator is able to cut-in on the busy line and listen for actual speech.

Operator monitoring of telephone conversations is an extremely sensitive area because it tends to abridge the telephone privacy of subscribers. Thus, it is desirable to allow operators access to a telephone connection for the legitimate purpose of verifying the existence of a conversation, while at the same time protecting the privacy of the customer by preventing the disclosure of the conversation content.

BACKGROUND ART

Various solutions to the problem of limiting operator access to telephone conversations have been proposed. One solution involves automatically cutting-off an operator after a prescribed time interval sufficient in duration for the operator to perform a legitimate monitoring operation. Another solution involves the scrambling, or distorting, of speech signals enroute to a monitoring operator so that the speech content cannot conveniently be ascertained.

The solution of automatically cutting-off an operator after a prescribed time interval is illustrated in U.S. Pat. No. 3,544,735, which issued to E. Olszewski et al on Dec. 1, 1970. This patent discloses a service observing system in which a pair of timers control the speech signal cut-off to an observing operator and other apparatus selectively recycles the timers to delay the automatic cut-off under specific conditions. Although effective for certain purposes, this solution has the disadvantage of allowing portions of a conversation to be overheard.

For verifying the busy condition of telephone lines, one telephone company has used a speech scrambling circuit interposed between a line being verified and an operator. The scrambling circuit distorts a speech signal by reversing its polarity at a 1400 Hz rate. Analog signal transmission gates inserted in each side of the telephone line and similar gates cross-connecting the two conductors of the line are alternately controlled to switch the speech signal polarity on the conductors at the 1400 Hz rate. The effect is said to render the speech signal unintelligible.

It is also known to distort an electrical speech signal by clipping (amplitude limiting) and rectifying.

In other related art fields involving speech conditioning and distortion, U.S. Pat. No. 3,647,970, which issued to G. P. Flanagan on Mar. 7, 1972, discloses a circuit for simplifying speech waveforms. A speech signal is converted to another signal having substantially constant upper and lower levels with abrupt transitions from one level to the other, the abrupt transitions being in time correspondence to amplitude changes in the speech waveform that exceed a predetermined rate of change. The circuit includes a high-pass audio frequency filter and clipping means for converting a filtered waveform to the constant level square wave. With reference to FIG. 4 of the patent, the simplified square waveform is scrambled by differentiating it to produce voltage spikes at the pulse transitions. The spikes are rectified and the rectified signal used to trigger a single-shot multivibrator. Each pulse output of the multivibrator is converted to a series of pulses which are transmitted to a receiving site where the scrambling technique is reversed to recover the original simplified square wave.

U.S. Pat. No. 3,614,323, which issued to W. L. Roberts et al on Oct. 19, 1971, discloses a circuit for use on subscriber loop carrier circuits to prevent eavesdropping of a voice frequency subscriber by a carrier frequency subscriber on the same loop. The circuit is composed of a rectifier section in series with a low-pass filter section to allow the transmission of DC and low frequency control signals while blocking voice frequency signals. A high-pass filter section bridges the rectifier and low-pass filter sections to allow the transmission of high-frequency carrier signals.

The known speech conditioning and scrambling circuits mentioned above appear to suffer in varying degree from one or more of the following deficiencies: some allow the scrambled speech signal to be decodable, others incompletely destroy the intelligibility of the speech content, while others destroy the recognizability of the signal as speech.

DISCLOSURE OF THE INVENTION

The solution of the above problem, in which a speech signal is rendered irreversibly unintelligible but recognizable by an operator as representing speech, is achieved by sampling the speech signal at a rate slow enough to destroy substantially the natural redundancy of the speech intelligence while controlling the duration of the samples to be approximately equal to or longer by some prescribed amount than the length of time of an average syllabic interval, and then by applying another form of analog signal distortion to offset the tendency of the long durational samples to render the scrambled signal intelligible. Importantly, the invention does not depend on the order of application of the signal distorting steps and the sequential application of the second distortion step followed by the sampling step is also effective.

In one preferred embodiment, a speech signal is sampled at a rate of 1 hertz, which I have found is slow enough to destroy the natural speech redundancy, and the duration of the samples is controlled to be 500 milliseconds. This duration is approximately 5 times longer than the average syllabic interval and significantly improves the ability of an operator to recognize the scrambled speech signal as representing speech. To offset the increased intelligibility of the scrambled signal resulting from the long durational samples, the samples are subjected both to rectification and low-pass audio frequency filtering, although either alone operating in conjunction with the sampling technique appears to be sufficient.

The invention is not limited to the sampling rate and sample duration of the preferred embodiment to be described. The beneficial scrambling effects described above may be obtained throughout a wide range of sampling rates and sample durations. More specifically, it appears that the scrambling technique is particularly useful for samples within the durational range of 100 milliseconds to 1 second and duty cycles (ratio of sample-on to the sum of sample-off plus sample-on times) of 20% to 67%.

DETAILED DESCRIPTION

Figure 1:
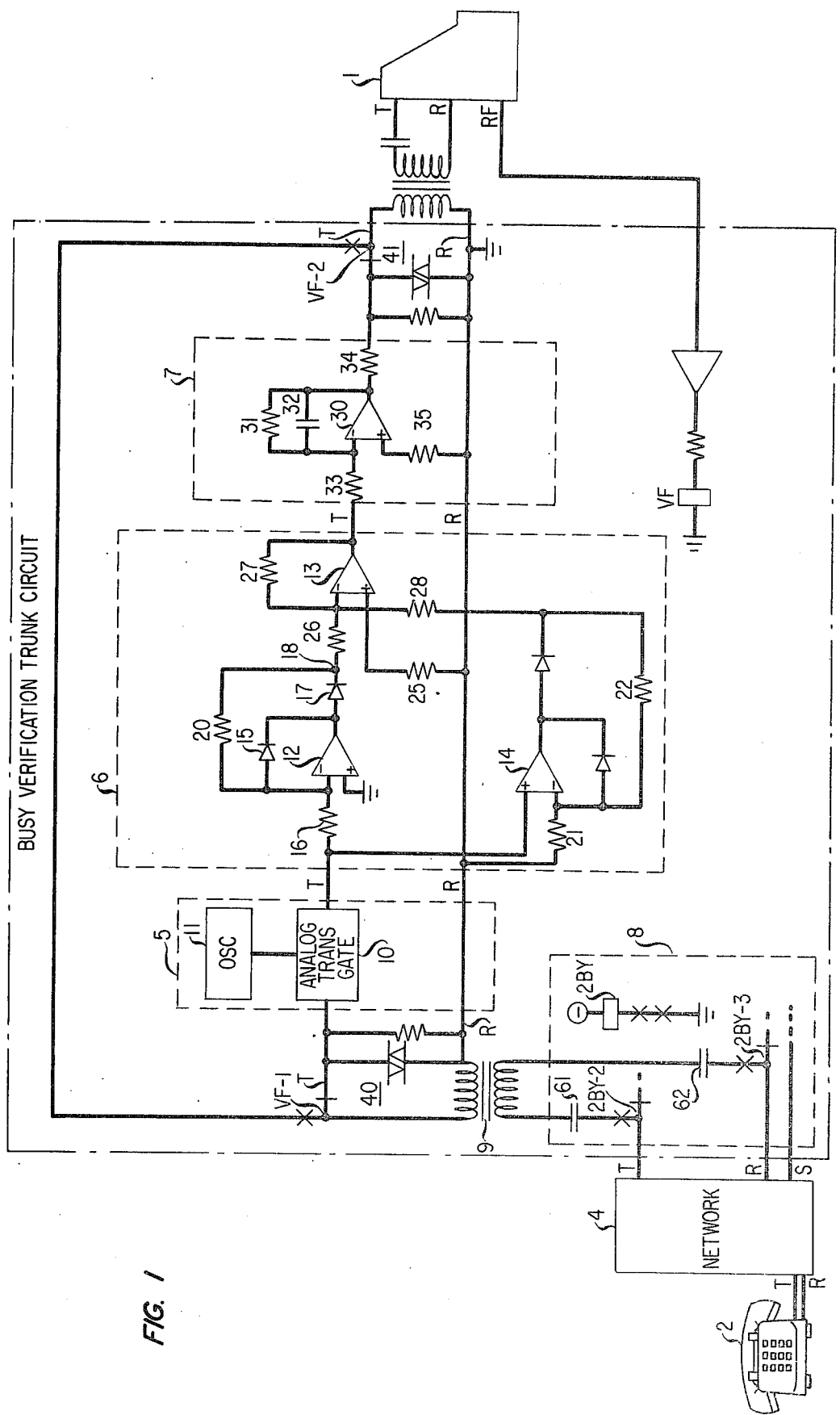
FIG. 1 is a detailed description of one illustrative scrambling circuit shown, by way of example, in a private branch exchange (PBX).

Referring to FIG. 1, it is assumed that a PBX operator at operator position 1 has been requested by a subscriber, via a telephone connection not shown, to verify a busy condition of PBX station 2. By depressing the appropriate keys at position 1, the operator is connected by means of busy verification trunk circuit 3 and network 4 to station 2. The details of this system and of trunk circuit 3, apart from the scrambling circuit to be described, are disclosed in U.S. Pat. No. 3,327,065, which issued to G. A. Michalopoulos et al on June 20, 1967.

Box 8, included as part of trunk circuit 3 in FIG. 1, encloses that circuitry disclosed in U.S. Pat. No. 3,327,065 to which my invention connects. For convenience, the designations of the equipment inside box 8 are identical with the designations for the same equipment as disclosed in FIG. 2 of U.S. Pat. No. 3,327,065. As taught in the patent, in the event that station 2 is not marked busy at the sleeve lead S at the time of attempted verification, the transfer relay 2BY in box 8 remains released and the break transfer contacts 2BY-2 and 2BY-3 connect the T and R leads of the station 2 line to other circuitry (not shown) of box 8. This other circuitry operates to ring the station and to establish a talking path to position 1 in the event the subscriber at station 2 answers the ringing.

On the other hand, in the event the station line is marked busy at the sleeve lead S, relay 2BY is operated and the make transfer contacts 2BY-2 and 2BY-3 connect the T and R leads of the station line to capacitors 61 and 62, respectively. In the patent disclosure, these capacitors are connected to the outgoing T and R leads extending to position 1 so that the operator at the position may hear any signals that are on the line. In the improved embodiment disclosed herein, the capacitors are connected to my novel speech scrambling circuitry so that the operator at position 1 will be able to recognize that speech is present, but will be unable to understand what is being said.

The speech signal from station 2 is applied to the scrambling circuitry by means of transformer 9 and the break contacts VF-1 of relay VF. Relay VF is normally released and is operated by means of an obvious path only in response to a prescribed key action by the operator at position 1. This feature allows the operator to bypass the scrambling circuitry by means of transfer contacts VF-1 and VF-2 and to converse with the subscriber at station 2 in the event of an emergency.

In this preferred embodiment, trunk circuit 3 includes three signal conditioning circuits 5, 6 and 7 for scrambling the speech signal from station 2. Circuit 5 samples an input signal to produce output samples thereof. Circuit 6 is a fullwave rectifier and circuit 7 is a low-pass audio frequency filter circuit. The signal conditioning circuits 5, 6 and 7 are arranged in tandem so that sampling, rectifying and filtering of the speech signal occurs in that order. However, it is not intended to so limit the invention since other orderings of these signal conditioning circuits are also effective. The circuits 5, 6 and 7 are disclosed in FIG. 1 as individual circuits that are designed to be interchangeable in the station line connection. Thus, for example, circuits 5, 7 and 6 could be placed in tandem in that order in FIG. 1 to provide sampling, filtering and then rectification of an incoming speech signal.

Regardless of the order of circuits 5, 6 and 7, they are protected from extraneous high voltages by varistor-resistor networks 40 and 41 connected across the T and R leads at the input and outputs of the scrambling circuitry, respectively.

Circuit 5 comprises an analog transmission gate 10 which is placed in series with the T side of the line. A number of such gates that would perform satisfactorily are commercially available, such as the SCL 4416AE gate manufactured by Solid State Scientific, Inc. of Montgomeryville, Pa. The analog gate is controlled by an oscillator 11 to interrupt the T lead of the connection to station 2 at the desired rate to produce the desired sample duration and duty cycle. These are illustratively 500 milliseconds and 50% in the preferred embodiment. As mentioned, the 500 millisecond sample duration is considerably longer than most syllabic intervals, which tend to be about 100 milliseconds in duration. This significantly aids the recognizability of the final scrambled signal as representing speech. The 500 millisecond sample-on time and the 500 millisecond sample-off time interrupts the speech signal sufficiently to destroy the natural redundancy of the speech intelligence so that a listener or a device will not be able to reconstruct the original speech signal or recover speech information.

In the illustrative, preferred embodiment, the samples from circuit 5 are inputted to fullwave rectifier 6, which comprises three operational amplifiers 12, 13 and 14. Amplifier 12 is arranged to rectify the negative portions of the incoming signal to circuit 6. Amplifier 14 is arranged to rectify positive portions of the incoming signal and amplifier 13 operates as a summing amplifier to combine the rectified signals from amplifiers 12 and 14 to produce a fullwave rectified output. Amplifier 12 operates to rectify as follows. A positive input signal on the T lead to circuit 6 causes current to flow through feedback diode 15 and into the low impedance output of amplifier 12. There is little or no current through feedback resistor 20. The output voltage at node 18 for a positive input voltage is therefore approximately 0 volts and is equal to the voltage drop across feedback resistor 20 plus the voltage at the negative input of amplifier 12, which is approximately 0 volts due to the virtual ground at that input.

For a negative input voltage on the T lead of circuit 6, diode 15 is back biased and does not conduct. Input current flows through input resistor 16 which comes from the output of amplifier 12, through diode 17 and feedback resistor 20. The output voltage at node 18 for a negative input voltage is therefore positive and is approximately equal to the voltage drop across resistor 20.

The operation of amplifier 14 is similar to that of amplifier 12 and its operation is described with reference to FIG. 1A of U.S. Pat. No. 3,471,714, which issued to Gugliotti et al on Oct. 7, 1969.

The amplifier stages 12, 13 and 14 may be any readily available high gain operational amplifier. Typical values of the remaining components of rectifier 6 are as follows:

| Resistors | |
|---|---|
| 16 | 10K ohms |
| 20 | 56.2K ohms |
| 21 | 10K ohms |
| 22 | 46.2K ohms |
| 25 | 10K ohms |
| 26 | 10K ohms |
| 27 | 10K ohms |
| 28 | 10K ohms |

In the preferred embodiment, the rectified signal from circuit 6 is extended to filter circuit 7, which comprises an operational amplifier 30 conventionally wired with feedback resistor 31 and capacitor 32 wired in parallel to produce an active filter having a single pole transfer function. Such a transfer function produces a 6 decibel per octave frequency response rolloff above a prescribed breakpoint frequency as discussed in Van Valkenburg, *Introduction to Modern Network Synthesis*, § 9.3 (1960). Values of the components are chosen to set an illustrative breakpoint frequency of 200 Hz and are:

| Resistors | |
|---|---|
| 31 | 20K ohms |
| 33 | 10K ohms |
| 34 | 664 ohms |
| 35 | 10K ohms |
| Capacitor | |
| 32 | .012 MF |

The rectification and filtering techniques described above introduce signal distortion that tends to offset the tendency of the relatively long 500 millisecond samples to render the scrambled speech signal intelligible. Thus, the overall effect of applying these three types of signal conditioning is to improve the recognizability of a scrambled speech signal as representing speech while at the same time maintaining the signal unintelligible.

It is to be understood that the above described arrangement is merely illustrative of the application of the principles of the invention, and that other arrangements may be devised by those skilled in the art without departing from the spirit and scope of the invention.

What is claimed is:

1. A method of rendering an intelligible analog electrical speech signal unintelligible but recognizable as representing speech, characterized by the steps of
   subjecting the speech signal to a first prescribed type of electrical signal distortion to produce a distorted signal and then subjecting the distorted signal to a second prescribed type of electrical signal distortion, wherein one of the first and second prescribed types of distortion consists of
   generating samples of the speech signal or distorted signal, with each sample having a duration within the range of 100 milliseconds to 1 second and having a ratio of sample-on time to the sum of sample-off time plus sample-on time within the range of 20% to 67%.

2. A method of rendering an intelligible analog electrical speech signal unintelligible but recognizable as representing speech, characterized by the steps of subjecting the signal to a first type of electrical distortion to produce a first distorted signal, then subjecting the first distorted signal to a second type of electrical distortion to produce a second distorted signal, and then subjecting the second distorted signal to a third type of electrical distortion, where the three types of electrical distortion make up the group consisting of
   repetitive sampling of one of said speech or said distorted signals to generate samples thereof of a prescribed duration, and duty cycle of substantially less than 100%,
   rectifying a second one of said speech or said distorted signals, and
   filtering a third one of said speech or said distorted signals to attenuate audio frequency components thereof according to a prescribed filter transfer function.

3. The method of claim 2 wherein the sampling step is characterized by
   generating said samples with each having durations within the range of 100 milliseconds to 1 second and a ratio of sample-on time to sample-off time plus sample-on time of 20% to 67%.

4. The method of claim 2 or 3 wherein each of said signal samples are 500 milliseconds in duration and are generated at a 1 hertz rate.

5. The method of claim 2 wherein the filtering step comprises subjecting said third one signal to a prescribed low-pass audio filter circuit characterized by a predetermined audio frequency rolloff response.

6. The method of claim 2 wherein the filtering step comprises subjecting said third one signal to a prescribed low-pass audio frequency filter characterized by an audio frequency rolloff of 6 decibels per octave of frequency above a predetermined breakpoint frequency.

7. A method of rendering an intelligible analog electrical speech signal unintelligible but recognizable as representing speech, characterized by the steps of
   repetitively sampling the speech signal at a prescribed rate to produce individual samples of the speech signal having prescribed durations and having duty cycles of substantially less than 100%,
   rectifying the samples of the speech signal, and
   attenuating different audio frequency components of the rectified samples by prescribed amounts.

8. The method of claim 7 wherein the sampling step is characterized by
   generating said samples each having durations within the range of 100 milliseconds to 1 second and a ratio of sample-on time to the sum of sample-off time plus sample-on time within the range of 20% to 67%.

9. The invention of claim 7 wherein the sampling step is characterized by
   generating said samples at a rate of 1 hertz with each having a 500 millisecond duration.

10. The invention of claim 7 wherein the rectifying step is characterized by fullwave rectification.

11. The invention of claim 7 wherein the attenuating step is characterized by subjecting the rectified signal samples to a low-pass audio frequency filter having a prescribed audio frequency rolloff characteristic.

12. A circuit for rendering an intelligible analog electrical speech signal unintelligible but recognizable as representing speech, characterized by first means for distorting the electrical speech signal in a first prescribed manner to produce a first distorted speech signal, and second means for further distorting the distorted signal in a second prescribed manner, wherein one of the first and second distorting means comprises means for generating samples of the speech signal or the first distorted signal, wherein each sample has a duration within the range of 100 milliseconds to 1 second and a ratio of sample-on time to the sum of sample-off time plus sample-on time within the range of 20% to 67%.

13. A circuit for rendering an intelligible electrical speech signal unintelligible but recognizable as representing speech, characterized by means for distorting the speech signal in a first prescribed manner to produce a first distorted signal, means for distorting the first distorted signal in a second prescribed manner to produce a second distorted signal, and means for distorting the second distorted signal in a third prescribed manner, wherein said three distorting means make up the group consisting of means for sampling an analog signal at a prescribed rate to produce individual samples of the analog signal each having a prescribed duration and having a duty cycle of substantially less than 100%, means for rectifying a second analog signal, and means for attenuating individual audio frequency components of a third analog signal by prescribed amounts according to the frequency of the components.

14. The invention of claim 13 wherein the sampling means is characterized by means for generating said samples each with a said duration within the range of 100 milliseconds to 1 second and a ratio of sample-on time to the sum of sample-off time plus sample-on time within the range of 20% to 67%.

15. The invention of claim 13 wherein the sampling means is characterized by means for generating the samples each having a 500 millisecond duration at a 1 hertz rate.

16. The invention of claim 13 wherein the rectifying means is characterized by a fullwave rectifier.

17. The invention of claim 13 wherein the attenuating means is characterized by a low-pass audio filter circuit having a prescribed audio frequency attenuation rolloff characteristic.

18. The invention of claim 17 wherein the low-pass audio filter circuit has a rolloff characteristic of 6 decibels per octave of frequency change asymtopically beginning at a predetermined breakpoint frequency of 200 Hz.

19. A circuit for rendering an intelligible analog electrical speech signal unintelligible but recognizable as representing speech, characterized by means for sampling the speech signal at a prescribed rate to generate individual samples of a prescribed duration and having a duty cycle of substantially less than 100%, means for rectifying the samples, and means for filtering the rectified samples through a low-pass audio frequency filter having a prescribed audio frequency rolloff characteristic.

* * * * *